Nov. 4, 1941.     H. G. SCHWARZ     2,261,418
OIL COOLER FOR INTERNAL COMBUSTION ENGINES
Filed May 10, 1940     2 Sheets-Sheet 2

WITNESS:

INVENTOR
Henry G. Schwarz
BY
ATTORNEYS.

Patented Nov. 4, 1941

2,261,418

UNITED STATES PATENT OFFICE 2,261,418

OIL COOLER FOR INTERNAL COMBUSTION ENGINES

Henry G. Schwarz, Marshallton, Del.

Application May 10, 1940, Serial No. 334,326

9 Claims. (Cl. 123—196)

This invention relates to an improved oil cooler for internal combustion engines, and more particularly to an improved type of cooler for use in maintaining the lubricating oil used in aircraft engines at a desired temperature.

As is known, the lubricating oil circulated through the engine or engines of an aircraft tends to become overheated, particularly in temperate or tropical climates, by the great amount of heat liberated by such engines, especially when driven at high speeds, and such overheating if permitted to continue leads to loss of lubricating effect and eventual carbonization of the oil.

It has accordingly been common practice to provide means for cooling the engine oil circulated through aircraft engines. The means heretofore used comprised essentially honeycomb core radiators in which hot oil to be cooled was passed through the interior of the radiator core, and a stream of air was passed over the radiator core to dissipate the heat.

Such coolers are neither efficient nor satisfactory in many respects. When located outside the aircraft, in the air stream created by the forward motion of the aircraft, as they must be for greatest efficiency, they create a heavy drag or resistance, requiring extra power in the aircraft or reducing the cruising and top speed of the craft. When located in the engine compartment such coolers must have an adequate air supply, furnished from an inlet duct ending in an air-scoop on the exterior of the aircraft. In such installations the efficiency of the cooler is limited, and the air-scoop creates a very appreciable drag, particularly at high speeds.

Even with the cooler located in the wing, and provided with an air inlet duct opening on the leading edge of the wing, so that no scoop is needed, the presence of the inlet opening causes an air turbulence which destroys the full efficiency of the wing, and limits the speed which the aircraft might otherwise attain.

Now in accordance with my invention, I provide a simple and compact oil cooling unit which may be located at any desired point within the aircraft and requires no connections to the exterior of the craft which will impair its aerodynamic efficiency.

In addition, I provide in accordance with my invention a cooler having sufficient cooling capacity to prevent the engine oil from overheating even when flying at high tropical temperatures.

I furthermore provide in accordance with my invention a cooler provided with automatic means for maintaining the engine oil temperature at any desired temperature selected by the pilot, which temperature may be changed at will from time to time.

Essentially the oil cooler in accordance with my invention comprises means for circulating the engine oil in heat interchange relationship with a liquefied refrigerant as, for example, sulphur dioxide, methyl chloride, ammonia, etc.; means for compressing and condensing the refrigerant, preferably driven from the aircraft engine, means for by-passing a predetermined portion of compressed refrigerant vapor past the condenser, and means responsive to the temperature of the circulating engine oil for automatically controlling the proportion of refrigerant vapor by-passed.

The construction and advantages of my improved oil cooler will be further apparent from a consideration of the accompanying drawings which illustrate a preferred embodiment of my invention and in which.

Figure 1:
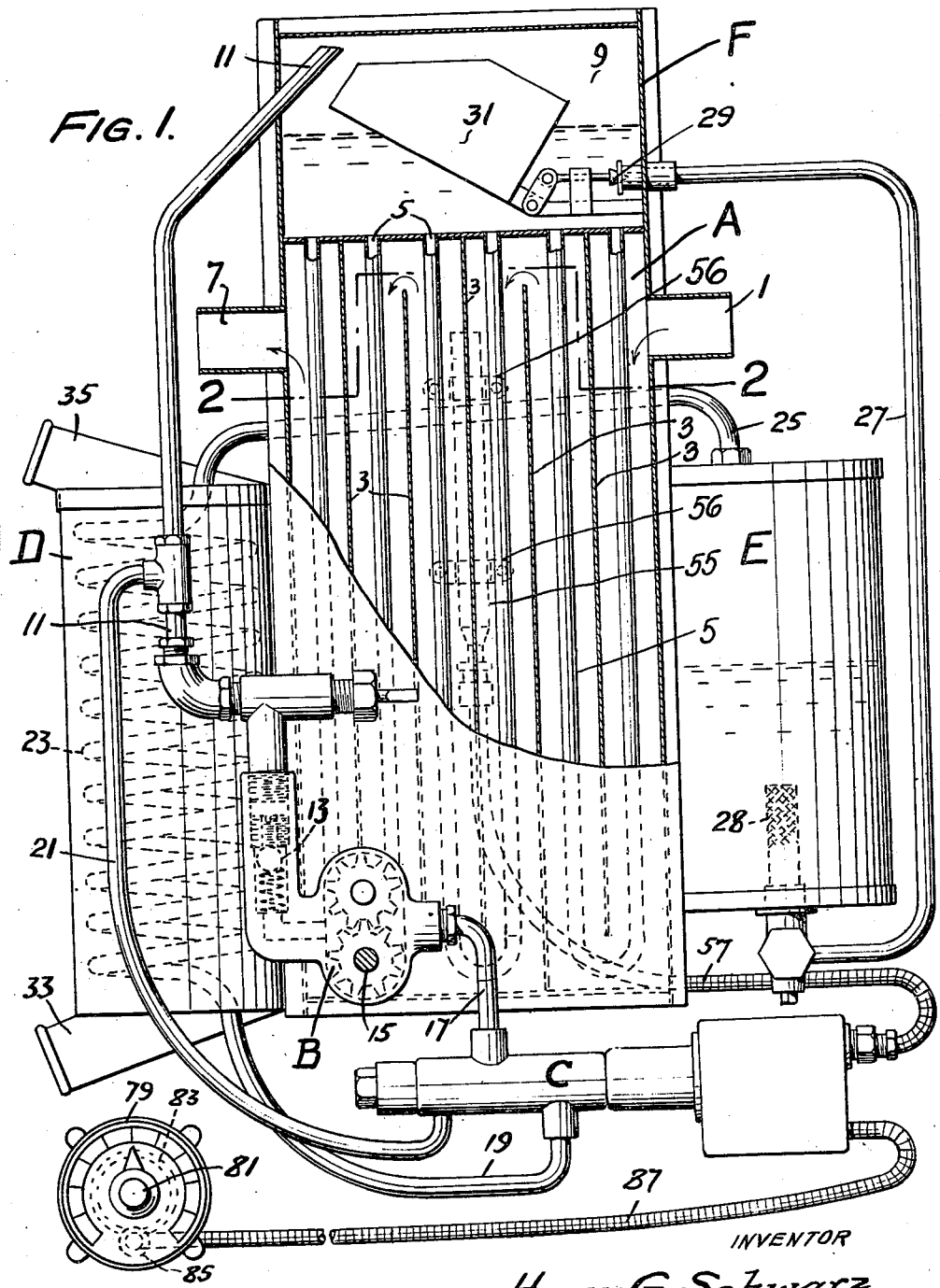
Figure 1 is an elevation, partly in section, of a preferred form of air cooler in accordance with my invention.
Figure 2:
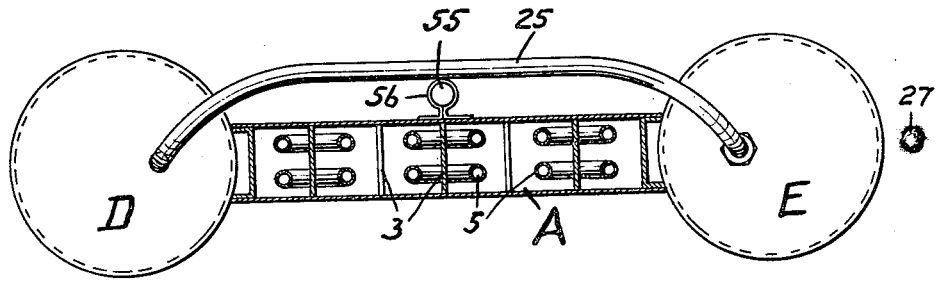
Figure 2 is a section on the line 2—2 in Figure 1, with the compressor and associated piping not shown, for clarity.

As shown in Figures 1 and 2 the oil cooler comprises a heat interchange unit A, a compressor B, a by-pass valve assembly C, a condenser D, a receiver E, and a float chamber F, all mounted as a unit. The cooler may be located anywhere in the aircraft, as in the power plant or nacelle section, or in the wing of a large bomber or transport, but desirably it will be located as near an engine as possible so that the necessary connections with the engine may be short.

The construction and function of these several units will become apparent from the following description of the operation of the cooler.

Hot engine oil from the aircraft engines circulated by the oil pump thereof is brought to the cooler through a suitable conduit (not shown) and enters the heat interchange unit A of the cooler at 1, flows around the baffles 3, as shown, over the U-shaped tubes 5 filled with liquefied refrigerant supplied from the float-chamber F, to which it gives up heat, and is discharged from the unit at 7, whence it flows back to the engines through a return conduit (not shown). Any desired number of tubes 5 may be positioned within the unit A; in the cooler shown six of them, arranged in three pairs, are used. The inside diameter of the tubes 5 should be sufficient to prevent vapor from sealing them against entry of liquefied refrigerant from the float-chamber F.

Liquefied refrigerant in the tubes 5 will be vaporized by heat taken up from the circulating oil and the vapor will collect in the space 9 above the liquid level in chamber F, whence it will be withdrawn through conduit 11 connected with the suction side of compressor B through a check-valve 13.

The compressor B, of the positive displacement type, will be driven through shaft 15, preferably by means of a flexible drive shaft connected in any suitable manner to an engine of the aircraft so that compressor B will be in operation whenever the aircraft engine is turning over.

The refrigerant vapor, after being compressed by compressor B to a pressure at which it may be condensed at ordinary temperatures, passes through conduit 17 to the by-pass valve assembly C, from which a regulated portion of the compressed vapor, determined by the setting of the by-pass valve as hereinafter described, passes to the condenser D through conduit 19, while the remainder is by-passed to the low-pressure side of the compressor through conduit 21.

High-pressure vapor from conduit 19 passes through condensing coil 23 in heat interchange with cold air supplied from outside the aircraft and is thereby liquefied. The liquefied refrigerant flows through conduit 25 from the condenser D to the receiver E, from which it is forced, by the pressure in the system, to the float-chamber F, through conduit 27 and valve 29, the latter controlled by float 31. A wire mesh strainer 28 is provided at the outlet from receiver E.

The air-inlet 33 for condenser D is connected through a conduit (not shown) with the exterior of the aircraft, but no air-scoop is used, and the condenser air-outlet 35 is connected by a second conduit (not shown) with the carbureter air-scoop (or intake manifold) of the engine. Outside air is thus sucked through the condenser D as long as the aircraft engine is running.

Figure 3:
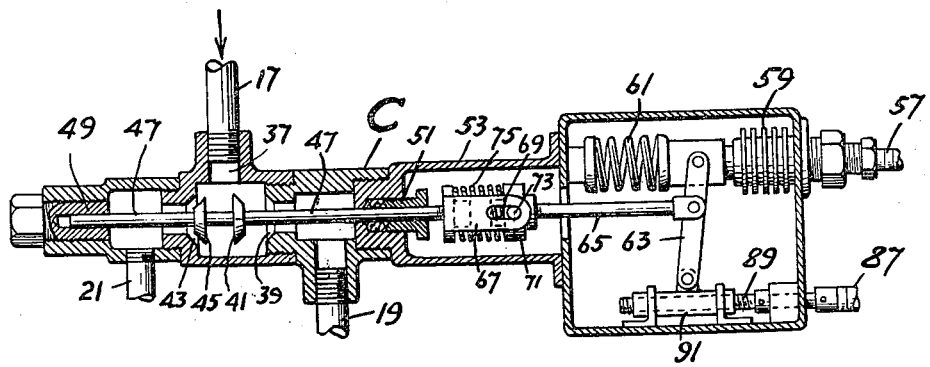
Figure 3 is a detail sectional view of the automatically controlled by-pass valve used in accordance with my invention.

As shown in Figure 3 the by-pass valve assembly comprises an inlet port 37 connected to conduit 17, an outlet port 39 leading to conduit 19 and controlled by valve 41, and a second outlet port 43 leading to conduit 21 and controlled by valve 45. Valves 41 and 45 are both mounted on valve stem 47 which at one end is guided in a recess in the plug 49 and at the other end extends through the gland 51 into the housing 53.

A thermally responsive bulb 55 of conventional type, filled with a readily expansible solid or liquid is secured by brackets 56 to the unit A so as to respond to the temperature of the oil flowing therethrough. The bulb 55 is connected by the flexible conduit 57 with a bellows 59 mounted in the by-pass assembly C. Upon an increase in temperature of the oil flowing through A, the expansion of the medium filling bulb 55 is communicated through conduit 57 to the bellows 59 and the latter expands against the pressure exerted by spring 61.

The movement of bellows 59 is communicated to the lever 63 and by it to link 65, whence it is transmitted through an overload release to valve stem 47. The overload release, in housing 53, comprises a yoke 67 mounted on the end of valve stem 47 and provided with slots 69, a head 71 mounted on the end of link 65 and provided with pins 73 engaged in slots 69 of the yoke 67, and a spring 75 mounted between the yoke 67 and head 71. Thus, movement of link 65 is transmitted to valve stem 47 through spring 75, which may be designed to yield at, for example, a pressure of 10 lbs./sq. inch, and when valve 45 has closed any further expansion of bellows 59 will be taken up in compression of spring 75.

The position of valves 41 and 45 may be altered independently of any movement of bellows 59 by means of the oil temperature regulator 79, mounted on the instrument panel of the aircraft and calibrated in degrees. Movement of knob 81 rotates a gear 83 which in turn rotates pinion 85 connected to the drive wire of flexible shaft 87. The opposite end of the shaft 87 is connected to the screw 89 so that rotation thereof moves the member 91, in which lever 63 is pivoted, right or left, and so changes the position of valves 41 and 45 and the setting of the automatic control mechanism.

As is apparent, an increase in the temperature of the oil passing through unit A will cause bellows 59, actuated by bulb 55, to expand and so move valves 41 and 45 to the left, closing port 43 and reducing the amount of refrigerant by-passed through conduit 21, and increasing that passing through conduit 19 to the condenser. The cooling effect of the refrigerant will thus be increased and the temperature of the oil leaving A lowered.

A decrease in the oil temperature in A will, in similar manner, permit bellows 59 to be compressed by spring 61, and valves 41 and 45 will move to the right, by-passing more refrigerant and lessening the cooling accomplished in unit A.

The oil leaving the heat interchange unit A will thus have a temperature closely approximating that for which the regulator 79 is set, and the pilot by changing regulator 79 may thus control the temperature to meet changing conditions.

It will be appreciated that the details of construction and operation hereinbefore set forth are merely illustrative of a specific embodiment of my invention, and that the invention is in no way limited thereby, but is capable of modification in various particulars without departing from the scope thereof.

What I claim and desire to protect by Letters Patent is:

1. An oil cooler for an internal combustion engine comprising, in combination, a heat interchanger, means for circulating hot engine oil through said heat interchanger in heat interchange relationship with a liquefied refrigerating medium, whereby the refrigerating medium is at least in part vaporized, a compressor for compressing the said vapor to a pressure at which it may be condensed at normal temperatures, and a condenser for condensing the compressed vapor for reuse in the heat interchanger, said condenser including an air inlet and an air outlet, the latter connected to the carbureter air supply of said engine, whereby air is drawn through said condenser in heat interchange relationship with said compressed vapor.

2. An oil cooler for an internal combustion engine comprising, in combination, a heat interchanger, means for circulating hot engine oil through said heat interchanger in heat interchange relationship with a liquefied refrigerating medium, whereby the refrigerating medium is at least in part vaporized, a compressor for compressing the said vapor to a pressure at which it may be condensed at normal temperatures, a condenser for condensing the compressed vapor for reuse in the heat interchanger, a conduit by-passing vapor from the high-pressure side to the low-pressure side of said compressor, a valve controlling the quantity of vapor passing through said conduit, a second valve controlling the quantity of compressed vapor passing from said compressor to said condenser, and means responsive to the temperature of oil in said heat interchanger for actuating both said valves.

3. An oil cooler for an internal combustion engine of an aircraft comprising, in combination, a heat interchanger, means for circulating hot engine oil through said heat interchanger in heat interchange relationship with a liquefied refrigerating medium, whereby the refrigerating medium is at least in part vaporized, a compressor for compressing the said vapor to a pressure at which it may be condensed at normal temperatures, means for driving said compressor from said engine, and a condenser for condensing the compressed vapor for reuse in the heat interchanger, said condenser including an air inlet opening to the exterior of said aircraft and an air outlet connected to the carbureter air supply of said engine, whereby air is drawn through said condenser in heat interchange relationship with said compressed vapor.

4. An oil cooler for an internal combustion engine comprising, in combination, a heat interchanger, means for circulating hot engine oil through said heat interchanger in heat interchange relationship with a liquefied refrigerating medium, whereby the refrigerating medium is at least in part vaporized, a compressor for compressing the said vapor to a pressure at which it may be condensed at normal temperatures, a condenser for condensing the compressed vapor for reuse in the heat interchanger, a conduit by-passing vapor from the high-pressure side to the low-pressure side of said compressor, a valve controlling the quantity of vapor passing through said conduit, a valve stem on which said valve is mounted, means responsive to the temperature of oil in said heat interchanger for actuating said valve, said means including a lever with which said valve stem is operatively connected, a pivot about which said lever moves, and means for moving said pivot to vary the operative range of said temperature responsive means.

5. An oil cooler for an internal combustion engine comprising, in combination, a heat interchanger including a plurality of U-shaped tubes adapted to contain a liquefied refrigerating medium, means for circulating hot engine oil through said heat interchanger and over said tubes, a refrigerant supply chamber positioned above said heat interchanger and into which said tubes open, a float-actuated valve determining the liquid level in said chamber, a compressor, a conduit leading from said supply chamber, above the liquid level therein to the inlet of said compressor, a condenser, a conduit leading from the outlet of said compressor to said condenser, a conduit by-passing said condenser and leading vapor from the outlet to the inlet of said compressor, a valve controlling the quantity of vapor passing through said by-pass conduit, a second valve controlling the quantity of vapor passing to said condenser, means responsive to the temperature of oil in said heat interchanger for actuating both said valves, and means for returning condensed refrigerating medium to said refrigerant supply chamber.

6. An oil cooler for an internal combustion engine comprising, in combination, a heat interchanger, means for circulating hot engine oil through said heat interchanger in heat interchange relationship with a liquefied refrigerating medium, whereby the refrigerating medium is at least in part vaporized, a compressor for compressing the said vapor to a pressure at which it may be condensed at normal temperatures, a condenser for condensing the compressed vapor for reuse in the heat interchanger, said condenser including an air inlet and an air outlet, the latter connected to the carbureter air supply of said engine, whereby air is drawn through said condenser in heat interchange relationship with said compressed vapor, a conduit by-passing vapor from the high pressure side to the low pressure side of said compressor, and a valve controlling the quantity of vapor passing through said conduit.

7. An oil cooler for an internal combustion engine comprising, in combination, a heat interchanger, means for circulating hot engine oil through said heat interchanger in heat interchange relationship with a liquefied refrigerating medium, whereby the refrigerating medium is at least in part vaporized, a compressor for compressing the said vapor to a pressure at which it may be condensed at normal temperatures, a condenser for condensing the compressed vapor for reuse in the heat interchanger, said condenser including an air inlet and an air outlet, the latter connected to the carbureter air supply of said engine, whereby air is drawn through said condenser in heat interchange relationship with said compressed vapor, a conduit by-passing vapor from the high pressure side to the low pressure side of said compressor, a valve controlling the quantity of vapor passing through said conduit, and means responsive to the temperature of said oil in said heat interchanger for actuating said valve.

8. An oil cooler for an internal combustion engine comprising, in combination, a heat interchanger including a plurality of tubes adapted to contain a liquefied refrigerating medium, means for circulating hot engine oil through said heat interchanger and over said tubes, a refrigerant supply chamber positioned above said heat interchanger and into which said tubes open, a float-actuated valve determining the liquid level in said chamber, a compressor, a conduit leading from said supply chamber above the liquid level therein to the inlet of said compressor, a condenser, a conduit leading from the outlet of said compressor to said condenser, and means for returning condensed refrigerating medium to said refrigerant supply chamber.

9. An oil cooler for an internal combustion engine comprising, in combination, a heat interchanger including a plurality of tubes adapted to contain a liquefied refrigerating medium, means for circulating hot engine oil through said heat interchanger and over said tubes, a refrigerant supply chamber positioned above said heat interchanger and into which said tubes open, a float-actuated valve determining the liquid level in said chamber, a compressor, a conduit leading from said supply chamber above the liquid level therein to the inlet of said compressor, a condenser, a conduit leading from the outlet of said compressor to said condenser, a conduit by-passing said condenser and leading vapor from the outlet to the inlet of said compressor, a valve controlling the quantity of vapor passing through said by-pass conduit, means responsive to the temperature of oil in said heat interchanger for actuating said valve, and means for returning condensed refrigerating medium to said refrigerant supply chamber.

HENRY G. SCHWARZ.